March 24, 1953 — N. C. PRICE — 2,632,295
INLET RAM FOR POWER PLANTS
Original Filed June 28, 1943 — 3 Sheets-Sheet 1
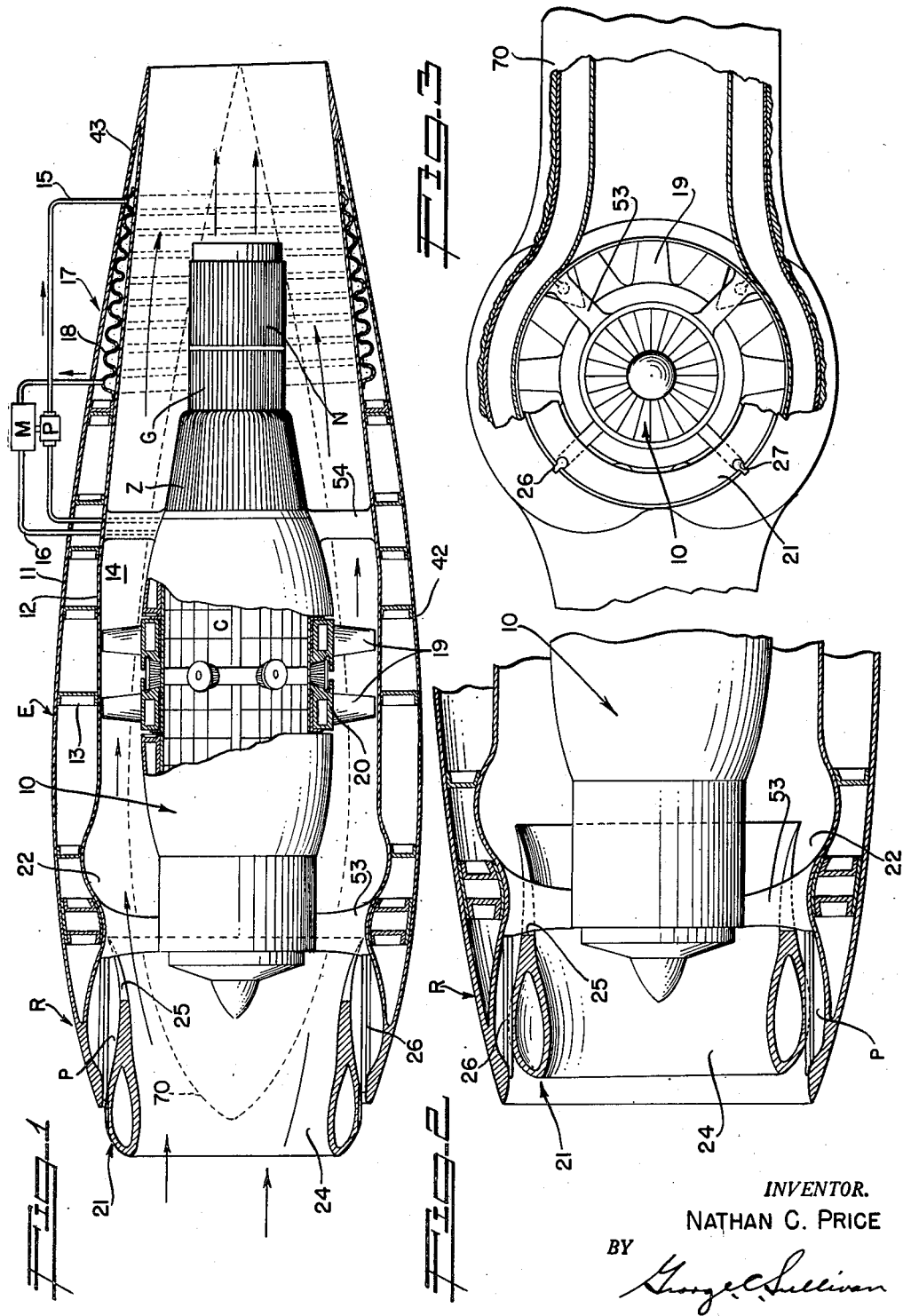
INVENTOR.
NATHAN C. PRICE
BY George C. Sullivan
Agent March 24, 1953　　　N. C. PRICE　　　2,632,295
INLET RAM FOR POWER PLANTS
Original Filed June 28, 1943　　　3 Sheets-Sheet 2
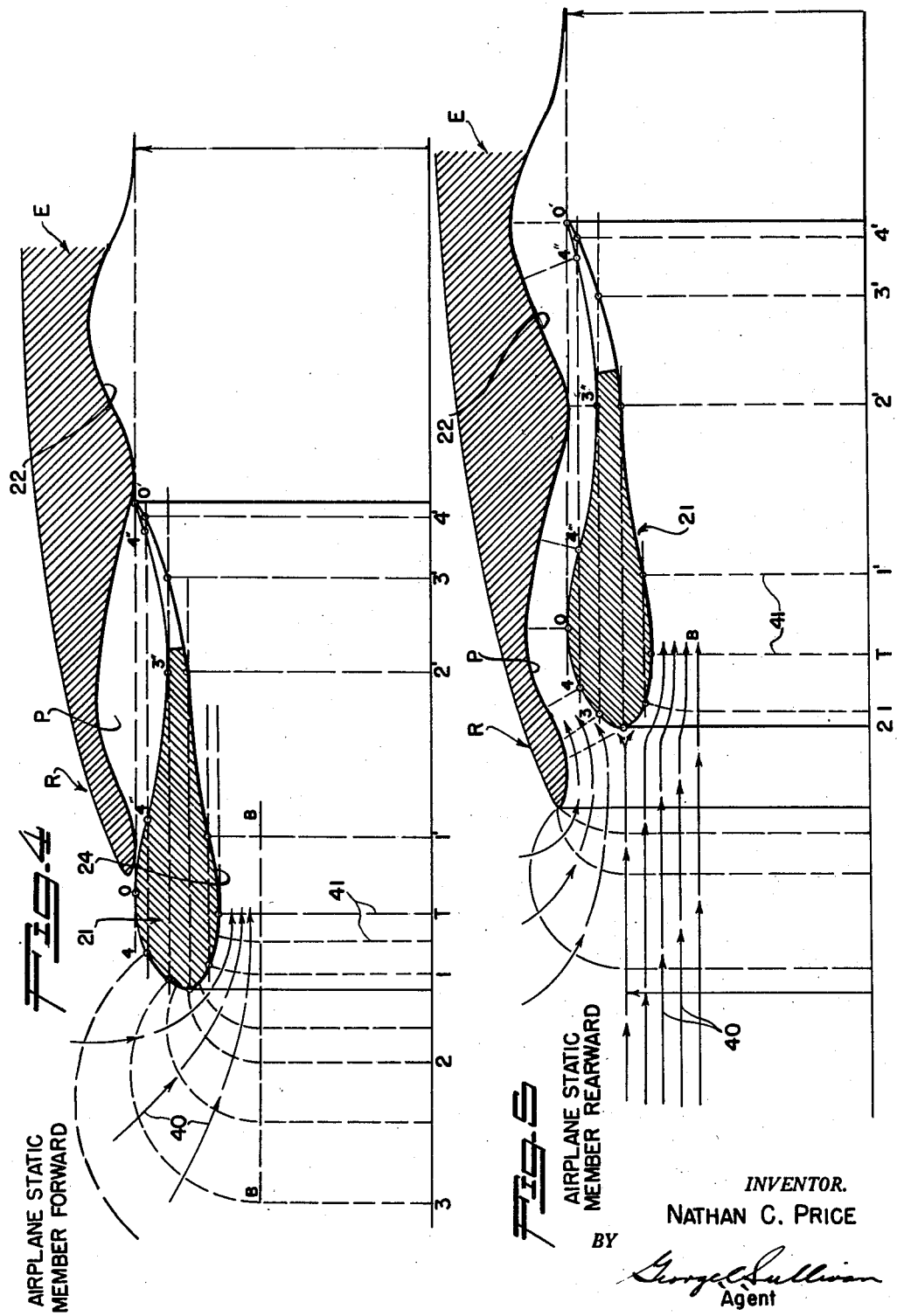
INVENTOR.
NATHAN C. PRICE
BY
George Sullivan
Agent March 24, 1953 N. C. PRICE 2,632,295
INLET RAM FOR POWER PLANTS
Original Filed June 28, 1943 3 Sheets-Sheet 3
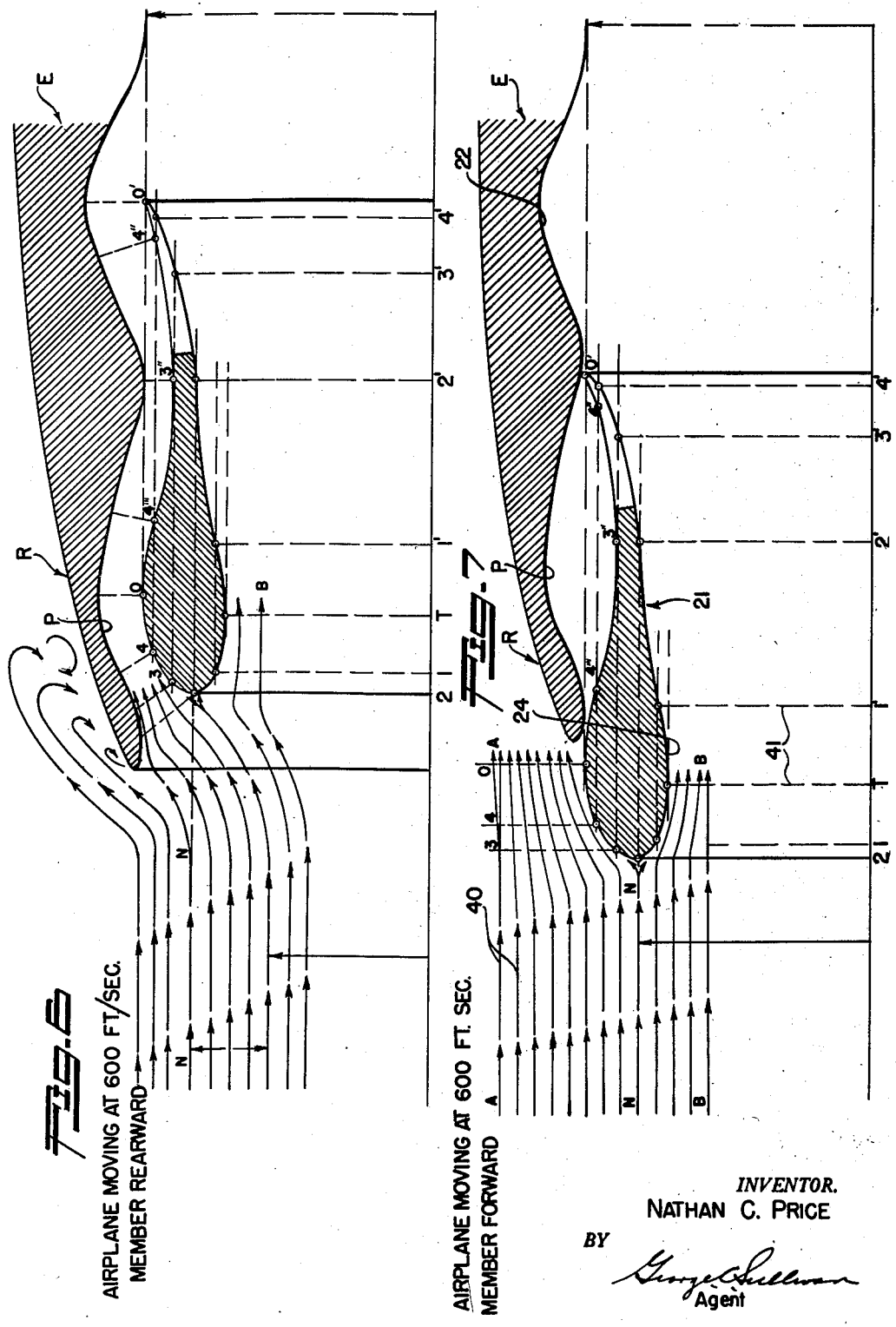
INVENTOR.
NATHAN C. PRICE
BY
George Sullivan
Agent Patented Mar. 24, 1953

2,632,295

UNITED STATES PATENT OFFICE 2,632,295

INLET RAM FOR POWER PLANTS

Nathan C. Price, Los Angeles, Calif., assignor to Lockheed Aircraft Corporation, Burbank, Calif.

Original application June 28, 1943, Serial No. 492,647, now Patent No. 2,501,633, dated March 21, 1950. Divided and this application August 28, 1946, Serial No. 693,471

11 Claims. (Cl. 60—35.6)

This invention is concerned with prime movers or power plants, and has more particular reference to the air inlet rams of power plants for propelling high velocity, high altitude aircraft, etc. This application is a division of my copending application for United States Letters Patent, Serial No. 492,647, filed June 28, 1943, now Patent No. 2,501,633, which is a continuation-in-part of my copending applications for United States Letters Patent, Serial No. 433,599, filed March 6, 1942, now Patent No. 2,540,991, and Serial No. 488,029, filed May 22,1943, now Patent No. 2,468,-461.

The air receiving or inducting inlet passages of the power plants for high velocity and high altitude aircraft are utilized to effect a "ramming" or compression of the air. This is particularly important in the case of reactive propulsion engines which handle large volumes of air and compress the same before it is delivered to the heat generator or hot gas generator. The present invention relates to the inlet rams for power plants of the reactive propulsion type and has for its general object, the provision of a practical, efficient device of this character.

Another object of the invention is to provide an inlet ram incorporating means responsive to or influenced by an increase or decrease in the air speed of the power plant and aircraft with which it is associated so as to automatically vary the effective area of the inlet passage.

It is another object of the invention to provide an inlet ram of the character referred to wherein the means for controlling the inlet passage includes a member movable therein in response to the aerodynamic conditions so as to be automatic in its operation. In the form of the invention disclosed herein the passage-governing member is moved without the necessity for providing special operating mechanisms, adjustments or other devices for effecting its movement.

A further object of the invention is to provide an inlet ram of the class referred to wherein the movable member operates by axial movement in the ram to open, restrict and close an auxiliary or supplemental ram passage and thus vary the total effective area of the ram inlet in accordance with the different air speeds of the aircraft.

Other objects and features of the invention will be readily understood from the following detailed description of a typical preferred form of the invention wherein reference will be made to the accompanying drawings in which:

Figure 1 is a longitudinal sectional view of a reactive type power plant embodying the features of the present invention and showing the movable member of the ram inlet in its forward position, the internal unit of the power plant appearing in side elevation;

Figure 2 is a fragmentary longitudinal sectional view of the forward portion of the plant illustrating the movable ram member in its rear position;

Figure 3 is a front view of the power plant with certain parts broken away to appear in vertical cross section;

Figure 4 is a fragmentary diagrammatic view illustrating a hypothetical position of the movable member when the airplane is static and with the power plant in operation, with resultant typical entering air stream lines and isobaric flow sections being indicated thereon;

Figure 5 is a view like Figure 4 with the movable member in actual rearward position while the airplane is static; and Figures 6 and 7 are similar to Figure 4 illustrating the member in hypothetical rearward and actual forward positions respectively with the airplane moving forwardly at a given velocity.

The present invention is concerned primarily with the inlet portion or ram of a reactive propulsion engine. This inlet or ram is capable of use on power plants varying considerably in type, construction and operational speeds. However, in order to adequately disclose the ram means of the invention I have illustrated and described the same in association with a power plant of the kind disclosed in my aforementioned Patent No. 2,501,633. It is to be understood that the present invention is not confined in its applications to this particular engine or class of engine. For this reason, the details of the general power plant are omitted from this disclosure and only the primary elements are shown and described in order to disclose the principles of operation of the invention.

The power plant illustrated in Figure 1 includes an internal unit 10 in the form of an elongate assembly having an open forward end for the reception of the rammed air and provided at its rear end with a discharge nozzle N. The internal unit 10 is in the nature of a hot gas generator or heat generator, and in accordance with the disclosure in Patent No. 2,501,633, may comprise a turbine G and a combustion chamber portion Z, both in upstream relation to the nozzle N and compressor means C in upstream relation to the combustion chamber for supplying the same with air under pressure. The power plant further includes a diffuser envelope E spaced around and enclosing the internal hot gas generating unit 10. In the drawings, the envelope E is shown "submerged" or housed in the wing 70 of an airplane, or the like, it being understood that the power plant may be mounted in other manners. The envelope E is an elongate streamline shaped enclosure having a divergent inlet to be more fully described below, an intermediate section 42, and a rear convergent nozzle or discharge section 43. Spaced struts 53 and 54 support the forward and rearward portions of the heat generator unit 10 in the envelope E so as to be centrally or co-axially positioned in the envelope. The envelope E has an outer skin 11 and an inner skin 12 with internal reinforcing hoops or rings 13 arranged between the skins. The inner skin 12 is spaced from the inner unit 10 to define or leave an annular air passage 14 leading from the ram inlet to the discharge nozzle 43. The rear chambered portion of the envelope E is employed as a heat exchanger 17. Pipes 15 and 16, and a pump P driven by a motor M circulate cooling fluid from the interior of the hot gas generator 10 through the heat exchanger space 17. This fluid is directed through a spiral passage 18 in the heat exchanger to flow in indirect heat exchange relation to the air traveling rearwardly through the passage 14. Counter rotating impeller blades 19 are carried by rotating rings 20 which surround the internal unit 10 and are driven by the turbine G. The blades 19 form a propulsive blower in the air passage 14. The structure thus fare described forms a portion of the subject matter of my Patent No. 2,501,633.

The inlet ram R of the present invention is characterized by a movable member 21 for varying the effective area of the ram passage 22. The ram R in the particular application of the invention illustrated, is an annular rearwardly divergent forward portion of the envelope E. The rammed air inlet passage 22 may be somewhat restricted in diameter in the region of the struts 53, there being an annular concavity in the passage between its forward lip and the struts. The ram passage 22 again flares or diverges rearwardly from the restriction adjacent the struts. The movable member 21 for varying the effective area of the inlet ram R is shown to be in the form of a tubular or annular part defining a rearwardly divergent opening or passage 24. The wall of this passage 24 is contoured so as to form a forward extension of the internal wall of the above described air passage 14 with the member either in the forward position of Figure 1 or in the rearward position of Figure 2. The member 21 is substantially airfoil shaped in cross section, and has a forward portion which is externally enlarged or somewhat bulbous. This portion of increased wall thickness is preferably hollowed or chambered out to reduce the weight. The member 21 is proportioned so that it is free to move axially in the ram R with desirable slight clearance. As shown in Figure 2, the member 21 is capable of moving rearwardly a considerable distance to have its trailing edge rearwardly of the struts 53. In order to permit this extensive rearward travel, spaced axial notches or slots 25 enter the member from its rear edge and extend forwardly therefrom. The slots 25 are adapted to receive the struts 53 when the member 21 travels rearwardly.

Means is provided for slidably supporting the inlet member 21 for free axial movement in response to aerodynamic conditions in the ram and forward portion of the diffuser envelope E. This means includes guide rods 26 secured at their rear ends in the struts 53 and secured at their forward ends in the lip portion of the ram R. The rods 26 are spaced apart circumferentially and extend axially or in parallel relation. As best illustrated in Figure 3, the guide rods 26 are bulb shaped in cross section and slidably engaged in correspondingly shaped channels 27 in the enlarged forward portion of the ram member 21. The guide rods carry the member 21 for free axial movement in the ram R.

With the movable inlet member 21 in the forward position shown in Figure 1, it serves to reduce the effective area of the ram passage, its forward portion operating to close off the annular space or passage P which surrounds the member. On the other hand, when the member 21 is in the rearward position of Figure 2, this auxiliary or supplemental passage P is open for the reception of rammed air and there is a substantial increase in the total effective cross sectional area of the inlet opening. At relatively low air speeds, for example, speeds under approximately 200 feet per second, the member 21 assumes a rearward position such as shown in Figure 2, being urged rearwardly by the drag of the entering air. In this position, the ram R has a maximum opening area for the induction of the maximum volume of rammed air. This rammed air is supplied to the internal heat generating unit 10 and the passage 14. As the velocity of the power plant increases, the pressure of the rammed air increases in the forward portion of the envelope E by the diffuser action, and this increased pressure acting on the rearwardly directed internal and external surfaces of the member 21 moves the member forwardly against the drag of the entering air. The member 21 automatically moves forwardly at the higher air speeds to assume a position where it restricts or substantially closes the outer or supplemental ram passage P to reduce the effective area of the ram R. During operation of the power plant, the member 21 will automatically assume a position to control the volume of the rammed air received or inducted by the engine substantially in proportion to its air speed. The movable member 21 responding to the aerodynamic conditions at the ram R consitutes an automatic control or governor element for the rammed air supply inducted into the power plant.

Figures 4, 5, 6 and 7 diagrammatically illustrate different positions, both hypothetical and actual, of the movable member 21 under conditions where the airplane is static and moving forwardly at a given velocity. In the description to follow it will be apparent that the member 21, under given conditions, will assume the actual position and cannot assume the hypothetical position, due to air forces acting thereupon. In each of these figures it is assumed that the power plant is in operation at rated rotative speed and that the design flow velocity of the air entering the ducted blading 19 is therefor approximately constant at a valued 350 feet per second for example. The lines 40 in Figures 4, 5, 6 and 7 illustrate the typical stream lines of the air entering the power plant inlet ram. The notations A and B signify the margins of undisturbed flow outside and inside of the member 21, respectively. The notation N signifies the margin of the orb of free air necessary to supply the rated volumetric flow to the ducted compressor at the assumed airplane forward speed. It will be assumed that the airplane is operating at sea level altitude, it being understood that although the forces acting upon the movable member vary in magnitude in the same ratio as the altitude density, these proportional forces do not change direction with altitude. In accordance with the streamlines 40, the broken lines 41 in Figures 4, 5, 6 and 7 indicate cross sectional flow areas of constant pressure extending from chosen points or lines on the surface of the member 21 where the pressures may be determined by applying Bernoulli's and the "Continuity" equations for flow of elastic fluid, as is customary in the solution of problems involving flow of elastic fluid through passages of varying cross section. The resulting values are thereafter integrated to obtain the net induced axial forces acting upon the member 21. These isobaric flow sections indicated by the lines 41 are designated 0, 4, 3, 2, 1, T, 1', 2', 3', 4', 0', 4'', 3'' and 4'''. Assuming the conditions of altitude, ambient temperature and the design air flow velocity (approximately 350 feet per second) entering the ducted blading 19, to be constant and uniform in the four conditions of operation illustrated in Figures 4, 5, 6 and 7 and employing Bernoulli's equation with the method of energies disclosed in Memorandum Number 6–44, Navships 250–330–6 of the United States Navy Department, the induced forces acting on the member 21 in the conditions illustrated diagrammatically in Figures 4, 5, 6 and 7 are approximately as follows, and to these forces are added skin friction forces customarily obtained by the fanning friction equation, to obtain the net force.

(1) Hypothetical condition of Figure 4 where the airplane is static and member 21 is assumed to be in a forward position—1230 pounds induced force acting in the rearward direction, plus 49 pounds skin friction force rearward, making a total force rearward of 1279 pounds.

(2) Actual condition of Figure 5 where the airplane is static and member 21 is in a rearward position—56 pounds induced force acting in the forward direction combined with 91 pounds skin friction force rearward, making a net force rearward of 35 pounds.

(3) Hypothetical condition of Figure 6 where the airplane is moving forwardly at approximately 600 feet per second and where the member 21 is assumed to be in a rearward position—1400 pounds induced force acting in the forward direction, minus 168 pounds skin friction force rearward, making a net force forward of 1232 pounds.

(4) Actual condition of Figure 7 where the airplane is moving forwardly at aproximately 600 feet per second and where the member 21 is in the forward position—2560 pounds induced force acting in the forward direction minus 172 pounds skin friction force rearward, making a net force of 2388 pounds.

The above enumerated induced forces acting axially upon the member 21 are derived by integration of the air pressure forces in pounds per square foot imposed on the surfaces of the member 21 at the isobaric flow sections designated by the lines 41, with respect to the ring areas of the member 21 projected in a forward or rearward direction as applicable.

(1) Condition illustrated in Figure 4 in which the absolute positive pressure acting on the forward facing portion of the member 21 dominates, pushing the member rearward.

| Flow sections | 0 | 4 | 3 | 2 | 1 | T | 1' | 2' | 3' |
|---|---|---|---|---|---|---|---|---|---|
| Lb. per sq. ft. pressure | 2115 | 2100 | 2080 | 1930 | 1585 | 1445 | 1570 | 1770 | 1890 |
| Flow sections | 4' | 0' | | | | | | | |
| Lb. per sq. ft. pressure | 1955 | 1975 | | | | | | | |

(2) Condition illustrated in Figure 5 in which the fore and aft induced axial pressures acting on the member 21 approximately balance, but in which the friction drag force dominates holding the member in rearward position.

| Flow sections | 0 | 4 | 3 | 2 | 1 | T | 1' | 2' | 3' |
|---|---|---|---|---|---|---|---|---|---|
| Lb. per sq. ft. pressure | 1940 | 1930 | 1980 | 2000 | 1930 | 1880 | 1925 | 1980 | 2015 |
| Flow sections | 4' | 0' | 4'' | 3'' | 4''' | | | | |
| Lb. per sq. ft. pressure | 2040 | 2030 | 2040 | 1875 | 1940 | | | | |

(3) Condition illustrated in Figure 6 in which suction force acting on the forward facing portion of the member dominates, tending to draw the member forward.

| Flow sections | 0 | 4 | 3 | 2 | 1 | T | 1' | 2' | 3' |
|---|---|---|---|---|---|---|---|---|---|
| Lb. per sq. ft. pressure | 2100 | 2005 | 2155 | 2410 | 2380 | 2345 | 2380 | 2450 | 2480 |
| Flow sections | 4' | 0' | 4'' | 3'' | 4''' | | | | |
| Lb. per sq. ft. pressure | 2500 | 2480 | 2345 | 1630 | 2070 | | | | |

(4) Condition illustrated in Figure 7 in which suction force acting on the forward facing and outer portion of the member is intensified by external air flow, increasing the force to hold the member forward.

| Flow sections | 0 | 4 | 3 | 2 | 1 | T | 1' | 2' | 3' |
|---|---|---|---|---|---|---|---|---|---|
| Lb. per sq. ft. pressure | 1630 | 1630 | 1910 | 2120 | 1820 | 1580 | 1809 | 2120 | 2250 |
| Flow sections | 4' | 0' | | | | | | | |
| Lb. per sq. ft. pressure | 2340 | 2370 | | | | | | | |

From the foregoing it will be seen that the movable member 21 will be moved or forced rearwardly when the airplane is static, thereby increasing the effective area of the inlet (Figures 4 and 5) and improving the efficiency of the ducted compressor flow system. However, the member 21 cannot remain in a rearward position when the forward velocity of the airplane is substantial (Figure 6) and has a strong force acting forwardly upon it to hold it in a forward position when the airplane forward speed is substantial. Under the condition of substantial forward speed, the efficiency of air diffusion is improved and external drag losses are reduced as will be seen by comparison of Figures 6 and 7.

Having described only a typical form of the invention, I do not wish to be limited to the specific details herein set forth, but wish to reserve to myself any variations or modifications that may appear to those skilled in the art and/or fall within the scope of the following claims.

I claim:

1. An air induction device for a power plant comprising an air conduit having a ram inlet at its forward end, the passage in the inlet being rearwardly divergent, and means for controlling the inlet including an airfoil shaped annular member movable between a rearward position where it is spaced from the wall of the inlet to leave an annular passage for the induction of air and a forward position where it cooperates with the divergent inlet to close said annular passage and thus reduce the effective air receiving area of the inlet, the chord of the airfoil member being substantially parallel with the longitudinal axis of the inlet the member presenting surfaces acted upon the aerodynamic pressures in the inlet to cause movement between said positions, the inlet being unobstructed except for said member.

2. In an aircraft propelling power plant, a diffuser having a ram inlet at its forward end, and a member, operated solely by aerodynamic means, mounted in said inlet to slide freely axially thereof under air pressure, said member having an air passage extending therethrough from one end thereof to the other, said ram inlet having a portion divergent relative to the outside surface of said member whereby an air passage is provided between said inlet and said member that varies in area as said member moves axially in said inlet, said member having at least one surface facing rearwardly and exposed to air pressure generated in said diffuser.

3. An air induction device for a power plant of the character described comprising an open-ended air conduit having a ram inlet and a diffuser at its forward end, and means for controlling the inlet including an annular member, opened at both ends and operated solely by aerodynamic means, mounted in said inlet to be freely slidable axially therein under air pressure, said member having a surface exposed to incoming air and having a rearwardly facing surface exposed to said diffuser and to air pressure generated therein so that said air pressure may tend to force said member forwardly against the action of the aerodynamic drag of the incoming air, said ram inlet having a portion that is rearwardly divergent relative to the outside surface of said member, whereby an annular air passage is provided between said inlet and said member that varies in area as said member is moved axially in said inlet.

4. An air induction device for a power plant of the character described comprising an air conduit having a ram inlet and diffuser at its forward end and means for controlling the inlet comprising an annular member, opened at both ends and operated solely by aerodynamic means, of airfoil shape in axial section movable axially in the inlet, said member having a surface exposed to incoming air and having a rearwardly facing internal surface exposed to pressure generated in the diffuser, whereby said member is urged forwardly against the action of the aerodynamic drag of the incoming air, said ram inlet having a rearwardly divergent portion providing an annular air passage between said inlet and said member that varies in area as said member is moved axially in said inlet.

5. An air induction device for a power plant of the character described comprising an air conduit having a ram inlet and a diffuser at its forward end and means for controlling the inlet comprising an annular member, opened at both ends and operated solely by aerodynamic means, of airfoil shape in axial section movable axially in the inlet, and means for guiding said member in its axial movement in said inlet, said member having a front face exposed to incoming air and having internal and rearwardly facing surfaces exposed to the pressure generated in the diffuser, said ram inlet having a rearwardly divergent portion providing an annular air passage between said inlet and said member that varies in area as said member is moved axially in said inlet.

6. An air induction device for a power plant of the character described comprising an air conduit having a ram inlet at its forward end and a diffuser behind said inlet, and means for controlling said inlet including an annular member, opened at both ends and operated solely by aerodynamic means, mounted coaxially of said inlet to be freely slidable therein, said member having a front face exposed to incoming air and having a rearwardly facing surface exposed to said diffuser, the internal surface of said ram inlet and the opposed external surface of said member being at varying distances apart from front to rear of said inlet whereby the air space between said member and said inlet is varied as said member moves axially in said inlet.

7. A reactive propulsion power plant comprising an envelope having a ram inlet, and a tubular throated member, opened at both ends, operated solely by aerodynamic means, mounted in said inlet, said inlet having a restriction therein, and one of said parts being movable longitudinally relative to the other to control the effective cross-sectional area of said ram inlet, said movable part being elongated in longitudinal section and arranged with its longitudinal axis substantially parallel with the axis of said inlet, said one movable part having a forward end surface facing in the upstream direction to be acted upon by the axial aerodynamic forces of the air flow into the ram inlet and having surfaces facing in part in the downstream direction to be acted upon by the induced pressures of the air flowing through the ram inlet, and means for supporting and guiding said movable part for free sliding movement axially of said inlet through the sole operation of air pressure on said forwardly and rearwardly facing surfaces of said movable part.

8. In a power plant of the character described, a diffuser having a divergent ram inlet at its forward end, an annular member, opened at both ends and operated solely by aerodynamic means, movable axially in the inlet to control the effective area thereof, said member having an elongate axial section and having its axis extending substantially parallel with the axis of said inlet, said member having a forward end surface exposed to and acted upon by the axial aerodynamic forces of the air flow into said inlet, and said member having internal and external surfaces facing in the rearward direction to be exposed to and acted upon by the air pressure in the diffuser, and means for supporting and guiding said member for free sliding movement axially of said inlet between a forward position where it restricts the effective size of said inlet and a rearward position where the effective size of said inlet is increased.

9. In a power plant of the character described, a diffuser having a divergent ram inlet at its forward end, an annular mmeber, opened at both ends and operated solely by aerodynamic means, movable axially in the inlet to control the effective area thereof, said member having an elongate axial section and having its axis extending substantially parallel with the axis of said inlet, means supporting said member for free axial movement in the inlet between a rearward position, where it restricts the inlet to a minimum extent, and a forward position, where it restricts the inlet to a maximum extent, said member having a forward end surface exposed to and acted upon by the air flowing into the inlet, and said member having rearwardly facing external and internal surfaces exposed to and acted upon by the pressures in said diffuser.

10. An inlet ram for power plants comprising a rearwardly divergent stationary annular ram, a movable annular member substantially airfoil-shaped in cross section located within said ram, said ram having a forward lip portion and an inner surface being annularly relieved immediately beyond said lip portion to provide a supplemental passage between said movable annular member and said ram, struts perpendicularly connected to said ram, axially aligned guide rods secured to said lip and said struts, said movable annular member having channels for slidable engagement with said guide rods and slots at the trailing edge adapted to receive said struts upon rearward travel of said member, said movable annular member having a bulbous leading edge and a trailing edge curved slightly toward said ram, whereby said movable annular member when in forward position shuts off the supplemental passage, the outer surface of said bulbous leading edge closely approaching the forward lip portion of said ram, and the curved trailing edge of said annular movable member closely approaching the restricted portion of said ram.

11. An inlet ram for power plants comprising a rearwardly divergent stationary annular ram, a hollow movable annular member substantially airfoil-shaped in cross section located within said ram, said ram having a forward lip portion and an inner surface being annularly relieved immediately beyond said lip portion to provide a supplemental passage between said movable annular member and said ram, struts perpendicularly connected to said ram, axially aligned guide rods secured to said lip and said struts, said movable annular member having channels for slidable engagement with said guide rods and slots at the trailing edge adapted to receive said struts upon rearward travel of said member, said ram being restricted in diameter in the region of said struts and relieved immediately beyond said restriction, said movable annular member having a bulbous leading edge and a trailing edge curved slightly toward said ram, whereby said movable annular member when in forward position shuts off the supplemental passage, the outer surface of said bulbous leading edge closely approaching the forward lip portion of said ram, and the curved trailing edge of said annular movable member closely approaching the restricted portion of said ram.

NATHAN C. PRICE.

REFERENCES CITED

The following references are of record in the file of this patent:

UNITED STATES PATENTS

| Number | Name | Date |
| --- | --- | --- |
| 2,396,598 | Neumann et al. | Mar. 12, 1946 |

FOREIGN PATENTS

| Number | Country | Date |
| --- | --- | --- |
| 596,856 | Germany | May 11, 1934 |
| 50,033 | France | Aug. 1, 1939 |
| | (Addition to Patent No. 779,655) | |